(12) United States Patent
Manrique et al.

(10) Patent No.: US 9,150,778 B2
(45) Date of Patent: *Oct. 6, 2015

(54) WORKING/CONTROL FLUID FOR HEAVY AND EXTRA-HEAVY CRUDE WELLS

(75) Inventors: Pablo Manrique, Caracas (VE); Franklin Archer, Caracas (VE); Maria Gracia Araujo, Barinas (VE); Deivis Suarez, Estado Tachira (VE)

(73) Assignee: Intevep, S.A., Caracas (VE)

(*) Notice: Subject to any disclaimer, the term of this patent is extended or adjusted under 35 U.S.C. 154(b) by 315 days.

This patent is subject to a terminal disclaimer.

(21) Appl. No.: 13/529,140

(22) Filed: Jun. 21, 2012

(65) Prior Publication Data

US 2013/0048288 A1 Feb. 28, 2013

Related U.S. Application Data

(63) Continuation-in-part of application No. 12/973,022, filed on Dec. 20, 2010.

(60) Provisional application No. 61/549,534, filed on Oct. 20, 2011.

(51) Int. Cl.
*E21B 43/25* (2006.01)
*C09K 8/60* (2006.01)

(52) U.S. Cl.
CPC ............... *C09K 8/602* (2013.01); *E21B 43/25* (2013.01)

(58) Field of Classification Search
CPC ................................ E21B 43/26; C09K 8/602
USPC .............................................. 166/300, 270.1
See application file for complete search history.

(56) References Cited

U.S. PATENT DOCUMENTS

| 4,068,716 | A | * | 1/1978 | Allen | 166/271 |
| 4,296,812 | A | * | 10/1981 | Kalfoglou | 166/270.1 |
| 2009/0008091 | A1 | * | 1/2009 | Quintero et al. | 166/270.1 |
| 2011/0160103 | A1 | * | 6/2011 | van Zanten et al. | 507/238 |
| 2012/0004146 | A1 | * | 1/2012 | Van Zanten et al. | 507/103 |

* cited by examiner

*Primary Examiner* — Zakiya W Bates
*Assistant Examiner* — Silvana Runyan
(74) *Attorney, Agent, or Firm* — Bachman & LaPointe, PC (57) ABSTRACT

A method for improving flow conditions in a porous media while servicing a well penetrating to the porous media includes: stopping drilling or production activities on the well; introducing a well control fluid into the well and the porous media, the well control fluid comprising a mixture of a surfactant, a co-surfactant and a carrier fluid; holding the well control fluid in the well and the porous media in the presence of water while the well is being serviced, such that the fluid penetrates the porous media and forms a water film on surfaces of the porous media; and when well servicing is finished, resuming drilling or production activities on the well.

15 Claims, 9 Drawing Sheets

| Contact angle measurement before | Photograph | Contact angle measurement after INTESURF™ | Photograph |
|---|---|---|---|
| 137.5° | | 45.1° | |

WORKING/CONTROL FLUID FOR HEAVY AND EXTRA-HEAVY CRUDE WELLS

CROSS REFERENCE TO RELATED APPLICATIONS

This application is a continuation-in-part of U.S. patent application Ser. No. 12/973,022 which was filed on Dec. 20, 2010. This application also claims the benefit of provisional application 61/549,534 which was filed on Oct. 20, 2011.

BACKGROUND OF THE INVENTION

The invention relates to a formulation and method of using same for improving well productivity in hydrocarbon reservoirs.

Improvement in productivity of heavy and extra heavy oil wells such as those found in the Orinoco River Belt in Venezuela is clearly desirable. Some of the largest reservoirs of heavy and extra heavy oil in the world are in Venezuela and hold oil having API gravity within the range of 6 to 16. Unfortunately, the production rate of much of this oil is unacceptable.

It is a high concern in the exploitation of heavy and extra heavy oil reservoirs to increase productivity during the well lifetime. With these wells, primary cold production schemes are quickly abandoned in favor of thermal methods to improve well flowability by reducing oil viscosity in the reservoir. These processes are costly and also still produce a low output in terms of final recovery. They also have serious problems of production of sour gas such as $H_2S$ and $CO_2$ which are very costly to address. Such thermal recovery methods typically produce final oil recovery below 35-40%.

Venezuelan heavy and extra heavy Orinoco River Belt oil sandstones are exceptional reservoirs. 60% of the reservoirs of this type have a KH/U value between 40 and close to 1,000 in very many cases. Unlike other reservoirs, however, the oil in Venezuelan extra heavy oil reservoirs is flowable at reservoir conditions.

Even these wells, however, have a final recovery by cold production which is very low and perhaps in most cases below three (3) percent of the original oil in place. The conditions for flow of oil in those reservoirs, with even excellent petrophysical properties, are very unfavorable to the flow of oil. The components of the heavy and extra heavy oil, particularly the asphaltenes in natural form in the native oil, are capable by natural fluid-rock interactions of generating an oil-wet condition at the surface of the natural mineral components of the sandstone. This produces the most adverse conditions to flow of oil in a porous media. This is a natural oil-wet condition of the reservoir media, which is a completely different condition as compared to formation damage in the well resulting from drilling or production activities, which could also happen in the well.

The need exists for improvement in production rates from wells producing from formations containing heavy and extra heavy wells, particularly those which contain asphaltenes and other hydrocarbons which lead to oil wet flow environments.

SUMMARY OF THE INVENTION

As a response to the above problems, especially to the natural oil wet conditions of the sandstone and the extremely low well productivity and recovery of the original oil in place, the present invention provides a formulation or stimulation fluid and a method of using the formulation for improving well productivity in cold production schemes and also in producing wells using thermal methods. The result is reflected by a better flow rate in the well, a lower pressure drawdown, and an improved recovery from the drainage area of the formation.

In accordance with the invention, a method is therefore provided for altering flow conditions in a porous media containing hydrocarbons, which method comprises the steps of preparing a mixture of a surfactant, a co-surfactant and a carrier fluid; transporting the mixture to the porous media; and holding the mixture in the porous media in the presence of water for a period of time sufficient to form a water film on the surfaces of the porous media.

It should be appreciated that the holding step involves holding the mixture in the well under substantially static flow conditions to allow the water film to form as desired. Thus, according to the invention, the treatment is advantageously carried out during other servicing of the well when production or drilling would be stopped anyway, thereby taking advantage of the down-time of the well and gaining a flow advantage in the well while the flow is being serviced.

In further accordance with the invention, therefore, a method is provided for improving flow conditions in a porous media while servicing a well penetrating to the porous media, comprising the steps of: stopping drilling or production activities on the well; introducing a well control fluid into the well, the well control fluid comprising a mixture of a surfactant, a co-surfactant and a carrier fluid; and holding the well control fluid in the well and the porous media in the presence of water while the well is being serviced, such that the fluid penetrates the porous media and forms a water film on surfaces of the porous media; and when well servicing is finished, resuming drilling or production activities on the well.

The result of the treatment of the present invention is a novel treated surface which enhances flow of hydrocarbons through pores defined by the treated surface, and this comprises a porous media having pore surfaces and containing heavy hydrocarbon including asphaltene, wherein the asphaltene is adhered to the pore surfaces, and wherein a water film is adhered to the pore surfaces and asphaltene.

BRIEF DESCRIPTION OF THE DRAWINGS

A detailed description of preferred embodiments of the present invention follows, with reference to the accompanying drawings, wherein.

DETAILED DESCRIPTION

The invention relates to a formulation or stimulation fluid which has a surfactant/co-surfactant mixture and a method for using same to treat surfaces of a hydrocarbon bearing formation and thereby enhance flow of hydrocarbons through same. This method is advantageously used to alter flow conditions in the formation to improve production of hydrocarbons from hydrocarbon-bearing formations. This can be done at any suitable time, but one particularly useful time to treat the well and formation is when a well is shut down for servicing.

As mentioned above, many significant hydrocarbon deposits in the world contain very large quantities of hydrocarbons under conditions where it is very difficult to produce them. One example of this is asphaltene-bearing hydrocarbon deposits in the Orinoco River Belt of Venezuela. In these formations, which typically have high and low pressures in the range of 300-1,500 psi, the heavy hydrocarbon fractions contained in the formation, especially asphaltenes, tend to adhere to the pore surfaces of the hydrocarbon and thereby create an oil-wet environment in the reservoir. As detailed above, this oil-wet flow environment is not at all conductive to production of those hydrocarbons from the formation. Further, as will be demonstrated below, this asphaltene is not easily removed because a portion of the hydrocarbon adsorbs into the rock surface making even cleaned surfaces oil wet and, therefore, unfavorable for good hydrocarbon flow. According to the invention, a water film is formed over the rock surfaces and also over the chemically adsorbed hydrocarbon so that the surfaces when coated in this manner are water wet. This greatly increases the flowability of hydrocarbons through the treated rock formation.

In accordance with the present invention, the surfactant/co-surfactant mixture is used to form a water film over the pore spaces of the formation, and also over the asphaltenes adhered to the pore surfaces, so as to provide a water-wet surface between the flow surfaces defined by the pore surface of the rock and asphaltene adhered thereto, and the volume of hydrocarbon in the formation which is intended to be produced. This water film increases flow of hydrocarbons through the formation, and thereby enhances production of hydrocarbon from the formation. Over a period of time, the water film eventually is removed by fluids flowing past the film, at which point the surfactant/co-surfactant mixture of the present invention can again be introduced into the hydrocarbon bearing formation to again deposit a fresh water film for use in the next period of production. This follow up treatment can advantageously be done at each well servicing, thereby keeping a water film in place as desired.

According to the invention, the surfactant/co-surfactant mixture preferably contains surfactant, co-surfactant and a fluid carrier, each of which has the following preferred constituents.

The surfactant is preferably selected from the group consisting of cationic surfactants, non-ionic surfactants, ampho­teric surfactants and combinations thereof. The surfactant is further preferably an ethoxylated nonyl phenol having between 4 and 60 ethoxylated groups.

Suitable non-ionic surfactants include but are not limited to octilphenol having 9-16 EO, nonylphenol with an EO number from 4 to 80, preferably 20-55, fatty acids of 9-20 EO, n-tet­radecanol of 9-20 EO, n-hexadecanol of 9-20 EO, laurate of sorbitan, and polyethoxilated fatty alcohols with EO number from 4 to 25, preferably 9-20. Suitable ionic surfactants include but are not limited to n-alkyl sulfates of K or Na, n-alkyl trimethyl ammonium chloride and combinations thereof.

The co-surfactant is preferably an alcohol co-surfactant, preferably one or more n-alcohols (C1-C6), and more preferably selected from the group consisting of methanol, etha­nol, propanol, butanol, pentanol, isopropanol and combina­tions thereof. The most preferred co-surfactant is methanol and/or ethanol.

The carrier fluid can be selected from the group consisting of organic solvents, light hydrocarbons, diluents, light crude oil and combinations thereof, brine, produced formation water and water. More specifically, the carrier fluid can be light oil, a light refinery cut, gasoil, diesel, diluent and water. The most preferred carrier fluid is water compatible with the formation fluids and minerals present in the formation rock. One example is produced water from wells in the same field or potable water with the same salinity of the formation brine and clay control additives.

The surfactant/co-surfactant mixture preferably is prepared having substantially equal amounts by volume of the surfactant and co-surfactant, and the overall mixture with carrier fluid preferably contains each of the surfactant and co-surfactant in an amount between 0.5 and 5% by volume, more preferably between 1 and 4% by volume.

In accordance with the invention, the surfactant/co-surfac­tant mixture can be prepared by mixing the above-identified constituents at the surface and then transporting, for example by pumping, the resulting mixture or stimulation fluid into a hydrocarbon producing formation, for example through a well positioned from the surface to the subterranean forma­tion, so that the mixture penetrates into the hydrocarbon-bearing formation around the well, typically into a radius surrounding the well of at least about 2 inches, preferably between 12 inches and as large as possible, for example up to 10 feet. There is no limitation in the amount of fluid that can drain to the formation since at all distances, contact of the rock surface with the fluid will be beneficial. The penetration area into the formation is the area to be treated in accordance with the present invention.

Once a sufficient volume of fluid is pumped into the for­mation, this volume is then held in place in the formation in the presence of water. The holding step can be done for the duration of a well servicing procedure which would require a temporary shutdown of the well, and in any event the holding should also be for a time sufficient to form the desired water film over surfaces of the pore spaces of the hydrocarbon and also over the hydrocarbons adhered to these surfaces. This advantageously provides a water-wet flow environment which is advantageous to the flow of hydrocarbon through the porous media, and therefore produces a flow environment which is far more conducive to the flow of oil than the natural oil-wet flow environment present in the well under natural formation conditions wherein the heavy hydrocarbons, and especially asphaltenes, are adhered to the pore surfaces of the porous media. The suitable amount of time to hold the fluid in the formation will vary with different wells, fluids and con­ditions, but will typically be between 12 and 24 hours and a preferred range of time between 18 and 24 hours. Any further time will not affect the benefits of the treatment in the formation.

Production from the treated well can be conducted while monitoring pressure drawdown in the well, and when the pressure drops sufficiently, or the well again needs servicing, the formation can be treated again in accordance with the present invention.

The typical formation for which the present invention can be utilized can be any formation wherein the forming of a water film over the pore surfaces would be beneficial to the overall hydrocarbon production from the formation. A particularly desirable application of the present invention is in formations having hydrocarbons with an API gravity of between 6 and 16, and even more preferably in formations containing hydrocarbons having an API gravity of between 6 and 12. These heavy and extra heavy hydrocarbon deposits in certain areas typically are very large in volume, but also contain asphaltenes as discussed above, and these are ideal candidates for treatment according to the present invention to enhance production. The typical rock formations containing such hydrocarbons have pore spaces which define the void volume which holds the hydrocarbons and which creates the permeability that allows the hydrocarbons to flow. The rock defining the pore surfaces of these formations are typically defined by quartz, feldspar, siliceous mineral, carbonaceous mineral, clays and combinations thereof.

Figure 1:
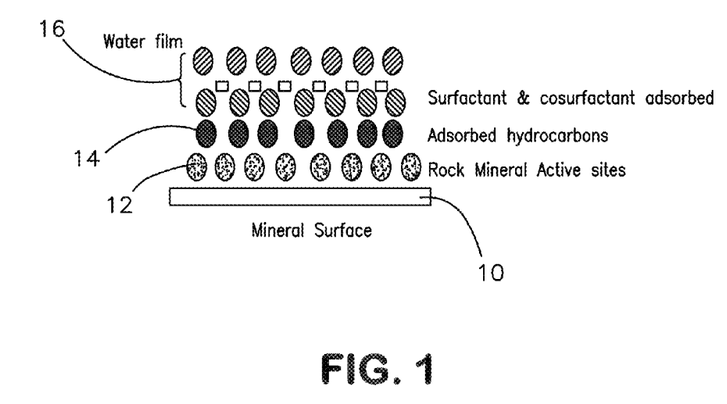
FIG. 1 schematically illustrates a treated surface in accordance with the invention.

FIG. 1 schematically illustrates a surface of a hydrocarbon bearing formation treated in accordance with the present invention. As seen in FIG. 1, a mineral surface 10 which defines the pore space of the formation has rock mineral active sites 12 along surface 10, and these rock mineral active sites 12 interact with hydrocarbons under the typical pressure in the formation such that chemically adsorbed hydrocarbons 14 are closely adhered to surface 10, particularly at rock mineral active sites 12.

According to the invention, the surfactant/co-surfactant mixture of the present invention is introduced to the formation and held there in the presence of water so that a film of water is formed over the adsorbed hydrocarbons 14 as well as the rock mineral active sites 12 of mineral surface 10. FIG. 1 shows surfactant/co-surfactant mixture adsorbed in the form of water film 16 which is schematically illustrated as a double layer to represent the surfactant/co-surfactant mixture. This produces a water-wet condition at the surface, which enhances flow of hydrocarbon through flow areas and pore space defined by such a treated surface. The water which forms the film can be water already present in the rock formation fluids and/or from the carrier fluid if a water containing carrier fluid is used. The water salinity can be in the range between 80 ppm up to 45,000 ppm.

Pressure drawdown, or the pressure drop from the formation to the well bore, is a good measure of the flowability in the formation. When the pressure drawdown is relatively small, this indicates good flowing properties in the formation to the well. While producing from a well that has been treated according to the invention, it is desirable to monitor the pressure drawdown, and after a certain amount of oil has been produced from a treated well, the pressure drawdown starts to increase. This increase in pressure drawdown indicates that the water film has been worn away or removed due to relatively high velocity flow of well fluids passing over the film to the well. This stream removes the water film by desorption of the surfactant and co-surfactant from the mineral surface and restoring the natural oil-wet initial condition at the mineral surface. At this stage, according to the invention, the well can be treated again with the same formulation, and this process can be repeated as many times as necessary until no more hydrocarbon fluids flow to the well even after treatment. With cyclic stimulation, the porous media will improve final recovery of the initial oil in place in the drainage area by cold production by potentially many times the amount of 3% typically reported as the well output obtained without stimulation. The present invention also reduces the time and need of costly thermal processes to reach this level of oil recovery. Further, the treatment is carried out during periods when the well is down for other servicing, thereby maximizing the overall efficiency by reducing or altogether avoiding any down time solely for treatment according to the invention.

Figure 2:
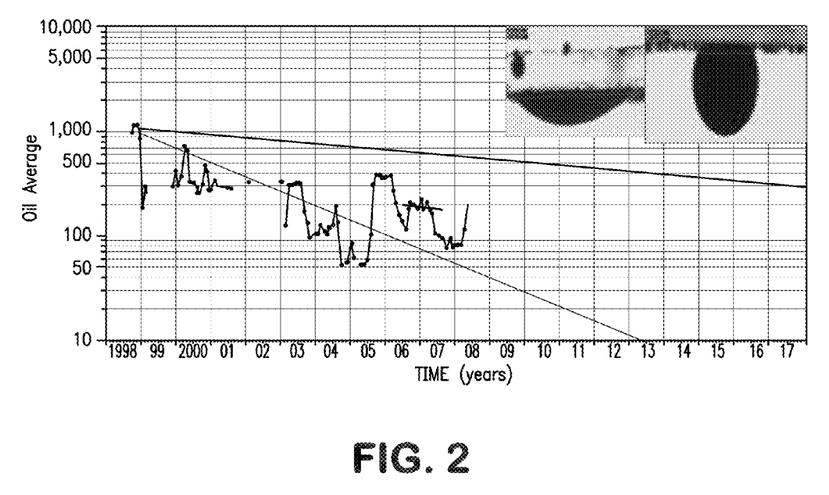
FIG. 2 illustrates typical and preferred flow rates from the hydrocarbon producing well.

FIG. 2 illustrates typical and desired flow rates from a hydrocarbon production well. The starts and stops shown in actual flow show a trend (line A) which is not desirable, while a preferred pressure behavior is shown at line B. The difference of the area between lines A and line B is an indication of greater recovery of oil from the same well in the same well drained area.

Figure 6:
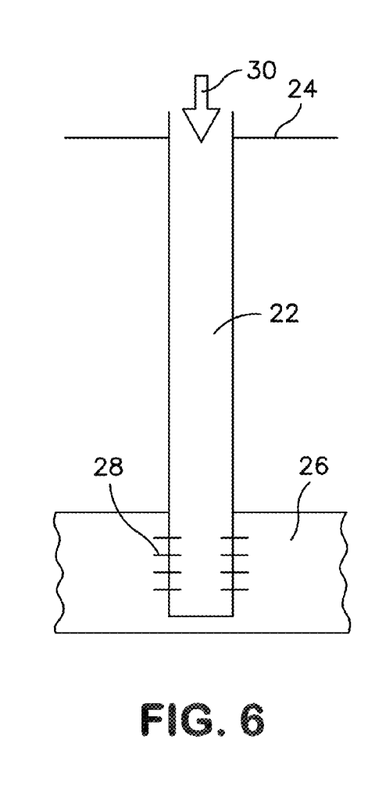
FIGS. 6-8 illustrate the method of the present invention being carried out while a well is being serviced.
Figure 7:
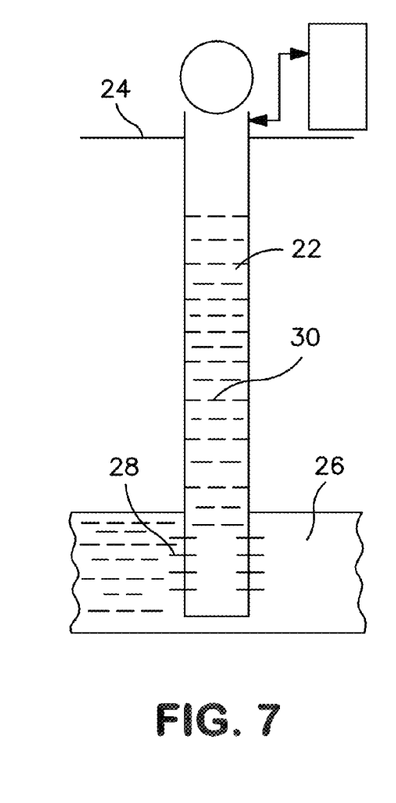
Figure 8:
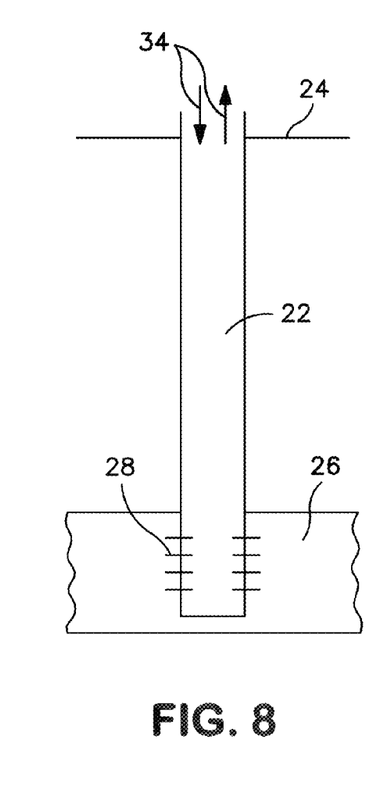

Turning to FIGS. 6-8, a well 22 is shown extending from surface 24 to a subterranean formation 26. Well 22 communicates with formation 26 through perforations 28. From time to time, such a well must be taken out of production, for example for servicing of various surface equipment, static pressure testing and the like. When such a procedure is to be conducted, it is typical to leave a column of fluid in the well to balance pressure of the formation. According to this aspect of the invention, the above-described mixture of surfactant and co-surfactant is used to simultaneously balance formation pressure and treat surface wettability of the porous media in the formation as well. Thus, FIG. 6 shows mixture 30 being introduced to well 22, and FIG. 7 shows mixture 30 being held in well 22 while servicing is being carried out (schematically illustrated at 32).

It should be noted that while FIGS. 6-8 are presented in terms of a producing well, the method of use of the mixture of surfactant and co-surfactant according to the invention can likewise be advantageously applied to a well during drilling when drilling operations are to be suspended for various servicing and the like. During such stoppages, pressure in the formation must likewise be balanced and a column of fluid is typically left in the well for this purpose. Since flow conditions in the well itself are still important for effective flow, as well as potentially some of the porous media through which drilling is conducted, holding the surfactant/co-surfactant mixture in the well during a break from drilling can likewise be advantageous.

Upon completion of servicing, well 22 can be returned to service, preferably while recovering the mixture for use on other wells. FIG. 8 shows well 22 returned to normal operation which is indicated schematically by arrow 34.

In deviated, horizontal, and/or multilateral wells, the formulation can be used in the same way. In those cases, the drainage of the formulation to the porous media will occur through the best channels of flow in the well making the water wet and highly conductive to oil channels thereby improving oil flow to the well. In the case of horizontal wells where pressure drawdown is very high at the heel of the well, during treatment while servicing the well for pump, rods, tubing replacements or other service jobs, the use of the formulation of the present invention as a servicing fluid will be very beneficial to oil production. When the pressure of reservoir is sufficiently high that servicing fluid are kept away from the rock surface, pumping of some volume of the fluid to the formation while servicing the well can be done to stimulate the well formation.

The following example further illustrates the invention and the results which are obtained using same.

Example 1

Crude oil and water from several wells in different areas of the Orinoco River Belt fields were collected. The oil and water were placed in closed glass vessels at several oil and water saturations, at reservoir conditions of water salinity and temperature, in a thermally controlled oven. Inside each vessel was placed a small glass plate which was monitored for wettability conditions starting with a water-wet condition and further being naturally changed to oil wet after a medium time period of about three to four weeks at reservoir temperature of 145° F. For each glass plate, wettability was measured by contact angle measurement techniques at the well temperature ranging from water-wet at the initial condition to oil wet after three weeks of aging process in the vessels at reservoir conditions.

Figure 3:
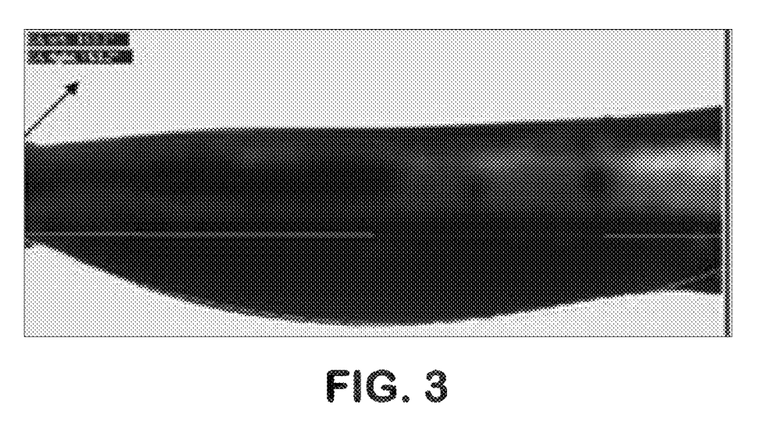
FIGS. 3 and 4 illustrate a test glass plate which is oil-wet in FIG. 3, and which has been treated in accordance with the present invention in FIG. 4.

After this treatment, the glass plates had a contact angle with oil which shows a strongly oil-wet condition as can be seen in FIG. 3, which shows the oil spreading over the plate surface.

Figure 4:
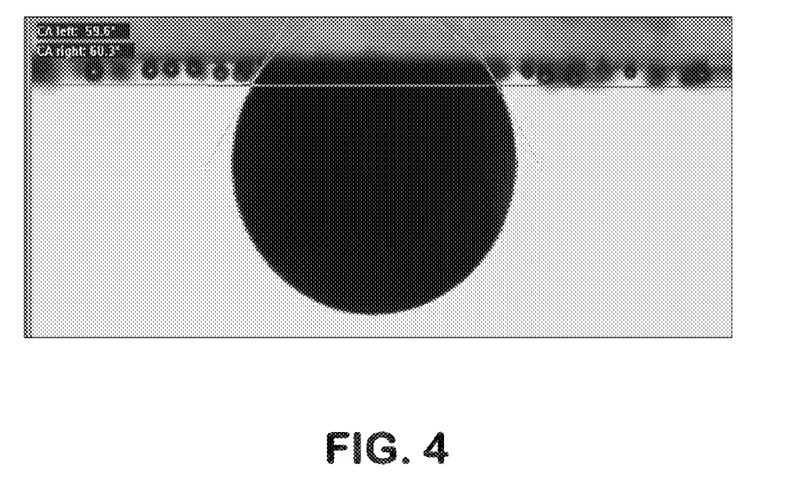

Each plate was then placed in a beaker for a soaking time with a mixture of equal amount of the well fluids in a mean average of 18% formation water and 82% extra heavy oil at 145° F. temperature, with the formulation of the present invention, which in this particular example comprised a solution of 1% volume of tridecanol with 16 ethoxylated groups and 1% volume of ethanol, both admixed with 98% diluent which was a light hydrocarbon cut used in the production area to improve the flowability of extra heavy oil at surface conditions. The mixture and the plate were held for an 8 hour exposure time at reservoir temperature of 145° F. and contact angle measurement showed wettability reversal from oil wet as shown in FIG. 3 to water wet as shown in FIG. 4. Note the bubbling up of the oil, and contact angle clearly indicative of the now water wet surface.

Figure 5:
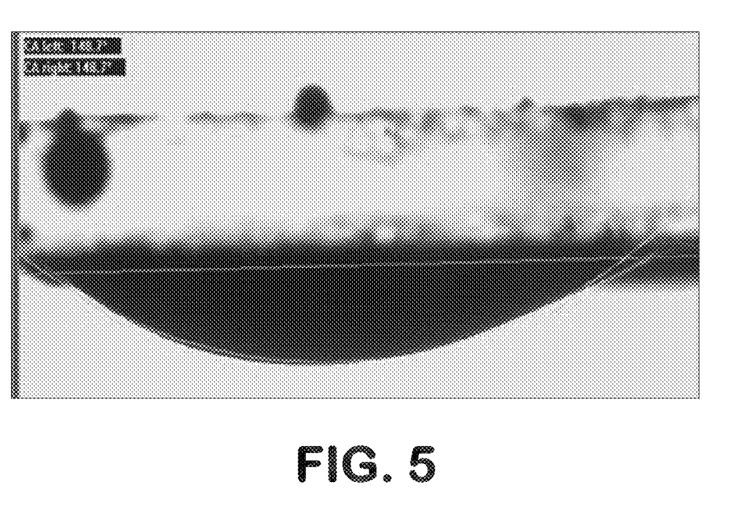
FIG. 5 shows the test plate is still oil-wet even after solvent cleaning.

Returning to the example, the glass plates were then soaked with a solution of mutual solvent for more than twenty four (24) hours to remove the water film and any visible hydrocarbon. The cleaned glass plates showed a clear and clean surface, but when a drop of water was placed on the plate, the water drop did not spread on the surface. The contact angle was measured and the plate still exhibited an oil-wet condition, as shown in FIG. 5.

This indicates that even though the mineral surface, such as sandstone, can be cleaned of adhered hydrocarbons still on that surface, there remains a chemically adsorbed film of hydrocarbon and therefore on such a mineral surface there exists a strong oil-wet wetability. As mentioned previously, the oil-wet wetability is the most adverse condition for the recovery of oil in a porous media. Thus, even by undertaking the cost and steps of removing the adhered asphaltenes, the resulting cleaned surface remains oil wet.

Use of the formulation and method of the present invention creates a water film on the mineral surface, covering the previously chemically adsorbed hydrocarbons. This film creates an interface that will conduct hydrocarbon flow for very long periods of time between stimulation cycles. A very low pressure drawdown is achieved with the increased oil flow rates, thereby providing great benefits to the productivity and final recovery of oil from the drained area of the well.

Example 2

Figure 11:
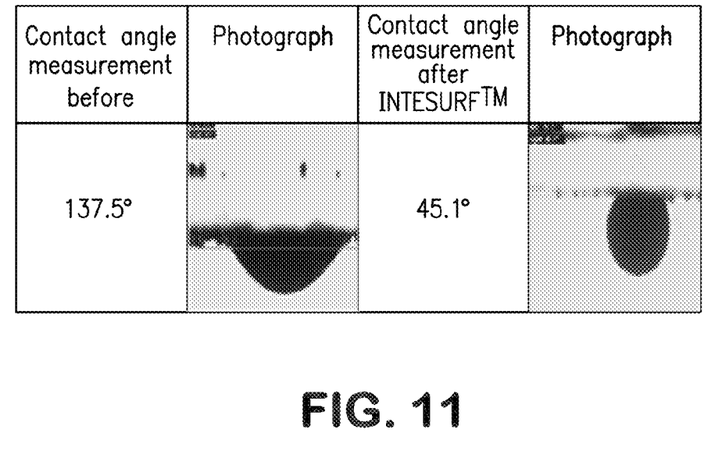
FIG. 11 illustrates a test glass plate before the plate is treated with the formulation of present invention and after treatment and 24 hours soaking time with fluids of the well CD 1405 of Cabrutica Field, Junin Division, Orinoco River Belt.

Crude oil and formation water from well CD1405 was collected as well as production water from disposal tank 903 from principal station of Cabrutica field in the Orinoco River Belt field. The characteristics of the crude oil and formation water are:

Oil:
Saturated %: 8 wt
Aromatics %: 44 wt
Resins %: 35 wt
Asphaltenes %: 13 wt
Acidity: 3.90 mg KOH/g
Viscosity CP 10,420 at 145 F
API: 9%
% C wt 84.55%
% H wt 11.12
Formation Water with 2,500 ppm NaCl The oil and formation water were placed in closed glass vessels at 20% saturation of formation water and 80% of oil saturations, at reservoir conditions of temperature of 145° F., in a thermally controlled oven. Inside each vessel was placed a small glass plate which was monitored for wettability conditions starting with a water-wet condition and further being naturally changed to oil wet after a time period of aging of three weeks at reservoir temperature of 145° F. For the glass plate, wettability was measured by contact angle measurement techniques at the well temperature ranging from water-wet at the initial condition to oil wet after three weeks of aging process in the vessels at reservoir conditions as shown in FIG. 11 in the left side view, indicating a contact angle of 137.5° at the aged condition, as it should be expected in the reservoir, showing the oil spreading over the plate surface.

The plate was then placed in a beaker for a soaking time with a mixture of equal amount of the well fluids in a mean average of 20% formation water and 80% of the 12° API extra heavy oil at 145° F. temperature, with the formulation of the present invention, which in this particular example comprised a solution of 0.5% volume of ethoxilated nonyl phenol with 30 ethoxylated groups and 0.5% volume of ethanol, both admixed with 99% of production water from disposal tank of the Cabrutica field of the Junin Division of The Orinoco River Belt. A one (1) lb/bbl of potassium acetate was added for clay control to the formulation. The mixture and the plate were held for 24 hour exposure time at reservoir temperature of 145° F. and contact angle measurement showed wettability reversal from oil wet of 137.5° to water wet with a contact angle of 45.1° as shown in FIG. 11 in the right side view. Note the bubbling up of the oil, and contact angle clearly indicative of the now water wet surface.

The above test was made to insure the wettability change in the well after application of the invention treatment in the porous media.

Similar results can be obtained by using various non-ionic and ionic surfactants. Suitable non-ionic surfactants include but are not limited to octilphenol having 9-16 EO, nonylphenol with an EO number from 4 to 80, preferably 20-55, fatty acids of 9-20 EO, n-tetradecanol of 9-20 EO, n-hexadecanol of 9-20 EO, laurate of sorbitan, and polyethoxilated fatty alcohols with EO number from 4 to 25, preferably 9-20.

Suitable ionic surfactants include but are not limited to n-alkyl sulfates of K or Na, n-alkyl trimethyl ammonium chloride and combinations thereof.

Suitable co-surfactants include but are not limited to any alcohol of the series of n-alcohols (C1-C6), such as methanol, ethanol, propanol, butanol, pentanol, isopropanol and mixtures thereof.

The carrier fluid of the surfactant composition can be light oil, a light refinery cut, gasoil, diesel, diluent, brine, produced water and water compatible with the formation fluids and the mineral in the rock. The most preferred carrier fluid is a the produced water and water compatible with the formation fluids and the mineral in the rock.

Example 3

A laboratory test was conducted for evaluating relative permeability with extraheavy crude oil and formation water and INTESURF™ 3PW0.5 solution prepared according to the invention with production water from the Cabrutica field of the Junin Division of the Orinoco River Belt Basin in Venezuela, and using a core of well E20P15 and the formation fluids of well DE 22 12 of the same field.

The core from a depth of 2212.2 feet from Cabrutica field was taken, and two samples were packed for use in a confined cell, one sample for return permeability test and the other sample for relative permeability test of extraheavy oil and formation water and extraheavy oil and INTESURF 3PW0.5 solution. The samples were cleaned, restored and aged for 16 days at the reservoir temperature of 120 F and pressure of 400 psi in a confined cell. An imbibition Amott test was performed to both samples to insure an oil wet condition of the sample before the tests. The core properties for two samples are shown in Table 1.

INTESURF 3PW0.5 solution is a mixture of 99% V/V production water from the Cabrutica field and a 0.5 V/V of nonylphenol ethoxilated with 30 ET groups, and 0.5 V/V % methanol. 1 lb/bbl of potassium acetate is added for clay control to the final admixture.

Return Permeability Test

Figure 9:
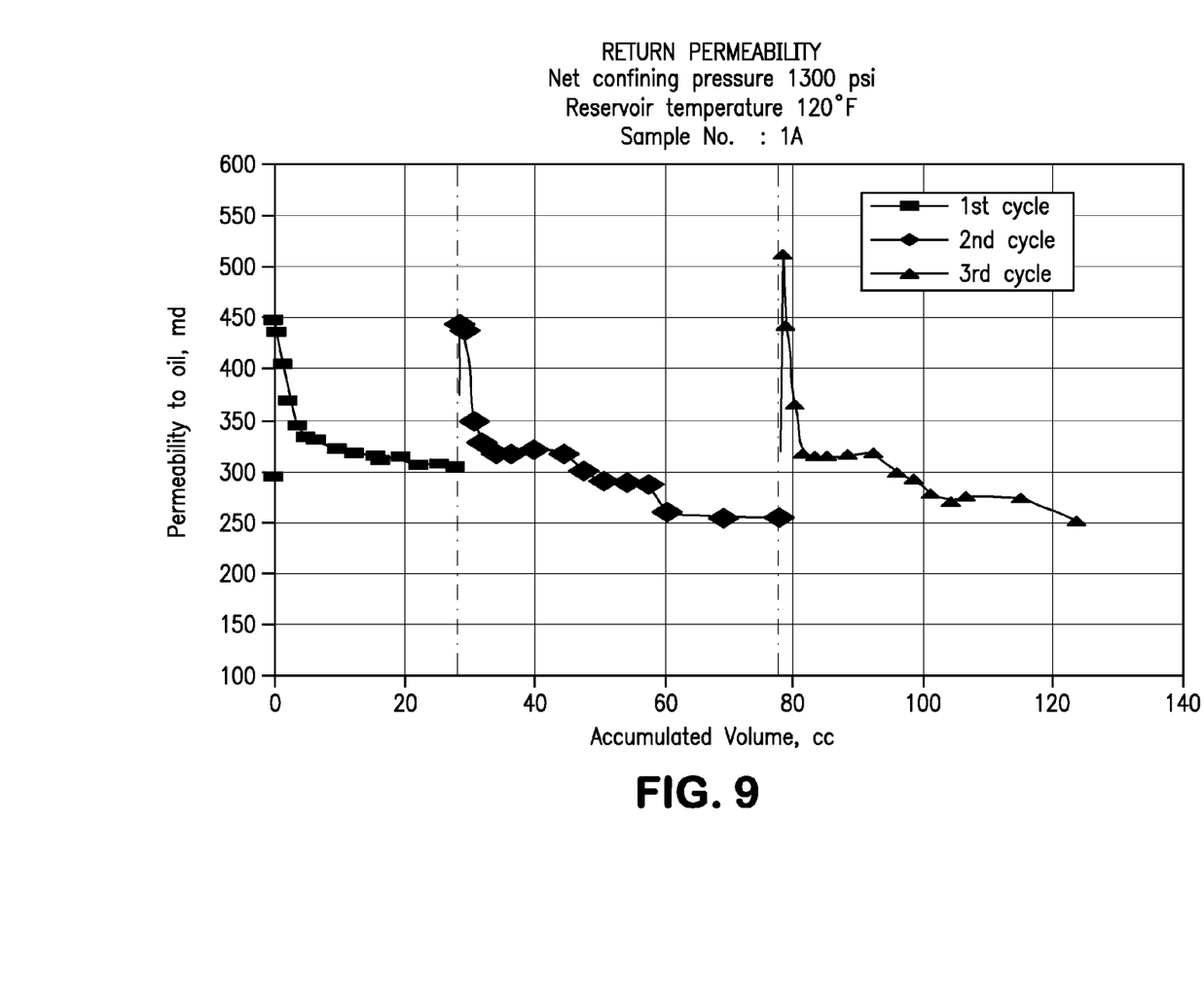
FIG. 9 illustrates the return permeability test using the formulation and method of the present invention with three cycles of injection in a reservoir core plug.

Core sample 1A with an oil wet condition confirmed by the imbibition Amott test was placed in the confined cell at 1300 psi confining pressure. Thereafter extraheavy live crude oil from well DE 22 12 of Cabrutica field was displaced until a constant pressure drop was achieved. The permeability to oil (Ko) at the initial water saturation was measured and this value was taken as the reference base relative permeability to oil in the sample. Three cycles of returned permeability test were made, and previous to each cycle, 10% of the porous volume of the sample was squeezed with the INTESURF™ 3PW0.5 solution into the production end of the core sample, and the same volume allowed to be discharged from the opposite end of the core sample. A soaking time of 24 hours was allowed to each cycle before the displacement of live crude oil was restarted. The rate of flow and the pressure drop was monitored and the permeability to oil at several points of porous volume displaced was measured. FIG. 9 exhibits the return permeability test results for each cycle and Table 2 the values from the test obtained.

TABLE 1

COMPANY INTEVEP S.A
CORE FROM WELL E20P15 CABRUTICA FIELD VENEZUELA

| Sample # | Confining pressure PSI | Weigth Total | Long | Diam | Vol. grain | Vol Pore space | Density grain | ∅ | Vol Total | PERMEABILYTY Air | Klink. |
|---|---|---|---|---|---|---|---|---|---|---|---|
| 1A | 1300 | 86.03 | 4.875 | 3.596 | 30.67 | 17.42 | 2.632 | 36.2 | 48.09 | 2697 | 2605 |
| 2B | 1300 | 96.42 | 5.143 | 3.702 | 34.42 | 19.22 | 2.628 | 35.8 | 53.64 | 2596 | 2507 |

TABLE 2

RETURN PERMEABILITY
Net confining presure 1300 psi
Reservoir temperature 120° F.

Company: INTEVEP  Sample No. 1A
Well: E20 - P15  Depth 2212.2 ft
Field: Cabrutica  Porosity 0.354 fraction
(Intesurf Plus)  K Kklinkemberg 2295 md
Stimulation fluid: INTESURF 3PW 0.5  (Ko) K to oil 294 md
INTESURF Carrier fluid: Production water
Squeezed stimulation fluid: 10% porous volume

| 1er cycle Vol. Acum.. cc | 2do cycle Vol. Acum.. cc | 3er cycle Vol. Acum.. cc. | 1er cycle K to oil. md | 2do cycle K to oil. md | 3er cycle K to oil. md | Skin factor SF = 1 − K/Ko |
|---|---|---|---|---|---|---|
| 0.19 | 28.58 | 78.58 | 448 | 444 | 511 | −0.737 |
| 0.35 | 29.61 | 79.08 | 436 | 437 | 442 | −0.502 |
| 1.14 | 30.93 | 80.37 | 405 | 350 | 366 | −0.243 |
| 2.30 | 32.28 | 81.51 | 369 | 328 | 318 | −0.081 |
| 3.38 | 34.45 | 83.43 | 344 | 318 | 315 | −0.069 |
| 4.93 | 36.48 | 85.30 | 334 | 317 | 315 | −0.070 |
| 6.48 | 40.02 | 88.41 | 331 | 321 | 316 | −0.074 |
| 9.68 | 44.38 | 92.16 | 322 | 318 | 318 | −0.081 |
| 12.45 | 47.67 | 95.64 | 318 | 301 | 299 | −0.017 |
| 15.60 | 50.97 | 98.39 | 316 | 292 | 293 | 0.004 |
| 16.50 | 54.22 | 101.42 | 311 | 290 | 278 | 0.054 |
| 19.50 | 57.39 | 104.21 | 314 | 287 | 271 | 0.080 |
| 22.39 | 60.42 | 106.78 | 306 | 260 | 276 | 0.063 |
| 25.36 | 69.24 | 115.14 | 307 | 254 | 274 | 0.069 |
| 28.13 | 77.50 | 123.55 | 304 | 255 | 252 | 0.143 |

A stimulation state was found in all cycles suggesting the cyclic stimulation of the sandstone—production end zone as a productivity improvement of the well by reducing the pressure drop and increasing the production of extraheavy oil from the well. No formation damage was observed even after a large amount relative to porous volume of live extraheavy oil was displaced on the coreplug and desorption of the surfactants of Intesurf™, (a trade mark owned by INTEVEP S.A. used to identify the formulation of the present invention) in the porous media occurs. After restimulation with the solution of the present invention, a better condition of relative permeability to oil is achieved. It is believed that the relative permeability to oil lost after a great volume of displacement of oil and after several cycles of squeezes is due to the new water saturation without Intesurf base surfactant increases in the porous media. However, it is observed that once the surfactant is available by restimulation in the porous media, a new improvement of the oil relative permeability is achieved and even reaches levels higher than earlier cycles.

A relative permeability test of extraheavy oil and formation water and extraheavy oil and INTESURF 3PW0.5 solution with production water was then conducted.

Core sample 2B was insured to have an oil wet condition by Amott imbibition test and thereafter was placed in a confined cell at confined pressure of 1300 psi. Temperature was that of the reservoir of 120° F. Extraheavy oil was displaced at a pressure of 1000 psi until a constant flow was achieved. The relative permeability effective to oil was measured at the initial water saturation. Thereafter, formation water was displaced at a constant rate of 1 cc/min and monitoring of the produced fluids and pressure drop was made until no flow of extraheavy oil is observed. The effective water permeability at the residual oil saturation is measured for each sample and the volume of extraheavy oil produced at room conditions is corrected to reservoir conditions using the viscosity and volumetric factor of the reservoir. The final saturation of the fluids is determined by material balance. The effective permeability of each phase is calculated using Darcy's Law. The relative permeability water-extraheavy oil and Intesurf solution-extraheavy oil ratios at non-stable state were calculated using the methods of Jones and Roszelle.

Figure 10:
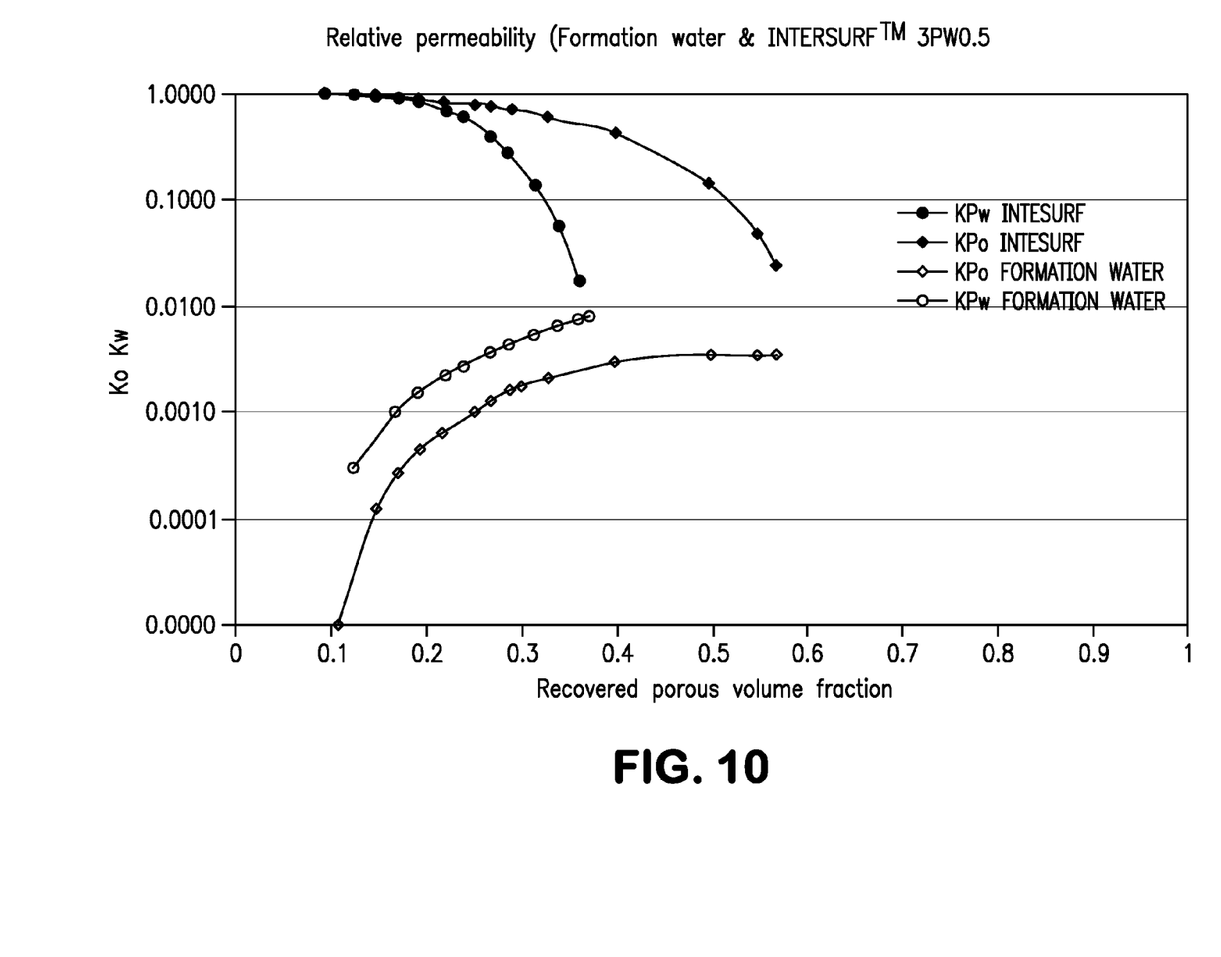
FIG. 10 illustrates relative permeability curves in a reservoir core plug using formation water and the formulation of the present invention with produced water as a carrier fluid.

Once the formation water-extraheavy oil test was run, extraheavy crude was displaced for the core sample until a condition of initial water saturation and extraheavy oil saturation was achieved. In this state the permeability effective to oil was measured again and displacement with the solution of INTESURF™ 3 PW0.5 took place with a rate 0.1 cc/min for 8 hours allowing a soaking time of 12 hours and so on until only solution of INTESURF™ 3 PW0.5 was collected as the production without any extraheavy oil. The final recovery of extraheavy oil was 10.02 cc which is a 52.13% of the total porous volume and 57.89% of the original extraheavy oil in place. FIG. 10 exhibits the behavior of Ko Kw vs the water saturation for the two testing fluids

Example 3

Two highly deviated Orinoco River Belt wells from the Cerro Negro area were selected for pilot testing. Main characteristics of the wells are:

| Well name | Reservoir name | Completion Date | Porositiy % | K Darcy | Vsh | Thickness ft | Production Method | Original pressure psi | Actual pressure psi | Lithology |
|---|---|---|---|---|---|---|---|---|---|---|
| CD 36 | OFIM CNX9 | April 1992 | 33 | 2.3 | 5.3 | 194 | Mechanical pump & Gravel pack | 1100 | 1095 | sandstone |
| CD 37 | OFIM CNX9 | February 1993 | 32 | 5 | 7.0 | 192 | PCP Gravel pack | 1350 | 1000 | sandstone |

An amount of 270 barrels of diluent, which is a light crude oil of 23 API gravity, was admixed with a previously homogenized mix of 1.3 barrels of tridecanol alcohol of 17 EO groups and 1.3 barrels of methanol in a tank of a pumping truck. The admixture was recirculated in the tank for homogenization and pumped to well CD 36 through the annular space between the tubing and the casing. The stimulation fluid of the present invention contacted the gravel pack downhole and passed to about two feet penetration in the formation. The well was closed for a soaking period of 24 hours. The well was restarted thereafter and showed an increased production of about 200 bpd that has been stable for a period of 60 days.

Another amount of 133 barrels of diluent, a light crude oil of 23 API gravity was admixed with a previously homogenized mix of 0.7 barrels of tridecanol alcohol of 12 EO groups and 0.7 barrels of methanol in a tank of a pumping truck. The admixture was recirculated in the tank for homogenization and pumped to well CD 37 through the annular space between the tubing and the casing. The stimulation fluid of the present invention contacted the gravel pack downhole and passed to about two inches of penetration in the formation. The well was closed for a soaking period of 24 hours. The well was restarted thereafter and showed a production of 80 barrels net of oil per day and has been stable for a period of 60 days thereafter. The net oil production before the stimulation was 24 barrels of net oil.

Example 4

The VB 19 well from the Petrocedeño joint venture of The Bolivarianan Republic of Venezuela PDVSA oil company in the Orinoco River Belt Junin Division was a candidate for a pump service. The well underwent a service job and INTESURF fluid according to the invention was used as a control and stimulation fluid, using the formulation and method of the present invention.

Crude oil and formation water from the VB 19 well have the following characteristics:
Oil:
Saturated %: 8 wt
Aromatics %: 44 wt
Resins %: 35 wt
Asphaltenes %: 13 wt
Acidity: 3.90 mg KOH/g
Viscosity CP 10,420 at 145 F API: 9%
% C wt 84.55%
% H wt 11.12
Formation Water with 2,500 ppm NaCl The service job in well VB 19 was prepared and the working control fluid was used to fill the annular space between the casing and the tubing, and the tubing. The well was closed at the wellhead and 80 barrels of the formulation was squeezed to the formation from the wellhead. Thereafter the rig worked taking out the tubing to surface and replaced the BCP pump for a new one, making another trip back to locate said pump downhole. Thereafter, the wellhead equipment and instrumentation of the well was replaced. The time elapsed for the whole service job was about 20 hours. This time was taken as the soaking time for the stimulation of the sand formation with the formulation of the present invention.

The total amount of fluid used during the whole job was 350 barrels and was prepared with clean, filtered potable water, 3.5 barrels of ethoxylated tridecanol of 17 ethoxylated oxide groups, 3.5 barrels of methanol and 343 barrels of water. Production increase was from a mean value before treatment of 183 bopd to a mean of 445 bopd after the treatment and the average intake pump pressure of the progressive cavity pump before treatment was around 5.74 bar (116 psi at 350 rpm) and after the treatment the average intake pump pressure of the progressive cavity pump increased to 13.74 bars (199 psi at 350 rpm).

Figure 12:
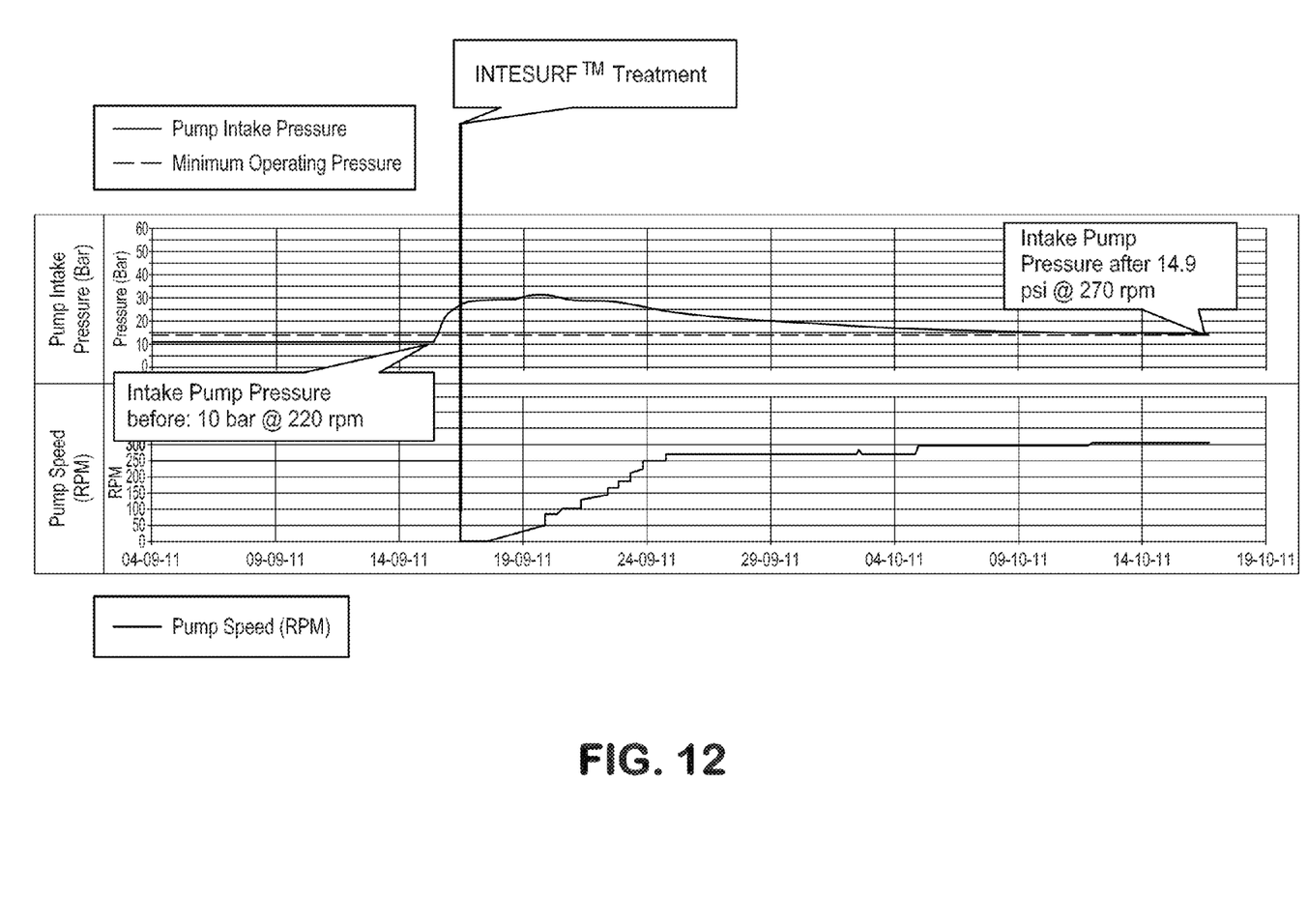
FIG. 12 illustrates the evolution of well VB19 in parameters as intake pump pressure, progressive cavity pump rpm before and after treatment with the formulation of the present invention.

Table 3 shows the VB 19 well reservoir and well parameters and FIG. 12 illustrates conditions before and after treatment monitored in the well as explained.

TABLE 3

| WELL | VB-19 |
| --- | --- |
| Geometry | HORIZONTAL |
| Field | Petrocedeño - Venezuela |
| Estación | San Diego |
| Sand/Reservoir | D2/D3/OFII BSDZ0002 |
| Slotted liner interval | 2050'-6100' |
| Sand Thickness | 30 |
| Permeability, mD | 16000 |
| Porosity, % | 28 |
| Temperature, ° F. | 120 |
| Fecha completación original | Sep. 02, 2007 |
| Actual reservoir pressure, psia | 510 |

Figure 13:
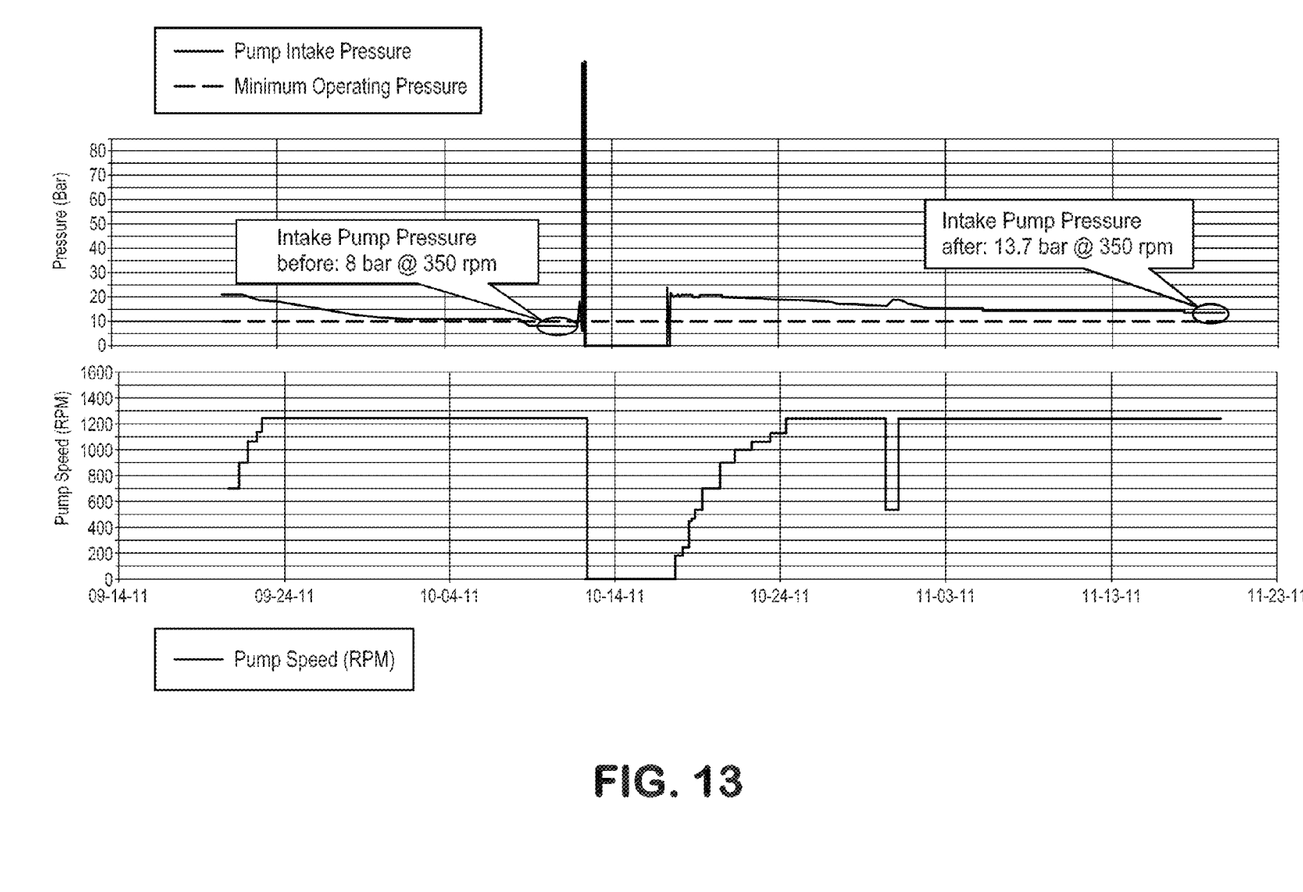
FIG. 13 illustrates the reported monitored downhole parameters as intake pump pressure, progressive cavity pump rpm in the well VD 18 of Petrocedeño field, Venezuela before and after treatment with the formulation of the present invention.

FIG. 13 illustrates the reported monitored downhole parameters in well VD 18 of Petrocedeño field in the San Diego de Cabrutica Principal Station Venezuela. In this well, of almost same characteristics of the VB19 well, the control working and stimulation fluid of the present invention was used, following the same procedure and composition as mentioned before for well VB19.

These pilot tests establish that the stimulation fluid, or formulation, of the present invention is highly effective at improving hydrocarbon flow and production through porous media treated with fluid. The fluid is made from readily available constituents, and the method can be carried out using known equipment already available for injecting other well stimulation fluids. Further, the method of the invention can be carried out during other well servicing, thereby gaining benefit of treatment according to the invention without substantial additional down time.

Based upon the foregoing, a beneficial change in permeability and production levels is demonstrated by using the formulation and method of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for improving flow conditions in a porous media while servicing a well penetrating to the porous media, comprising the steps of:
    stopping drilling or production activities on the well;
    introducing a well control fluid into the well and the porous media, the well control fluid comprising a mixture of a surfactant, a co-surfactant and a carrier fluid;
    holding the well control fluid in the well and the porous media in the presence of water while the well is being serviced, such that the fluid penetrates the porous media and forms a water film on surfaces of the porous media; and
    when well servicing is finished, resuming drilling or production activities on the well.

2. The method of claim 1, wherein the surfaces of the porous media prior to treatment with the mixture have hydrocarbons adhered to them, and wherein the water film is formed over the surfaces and the hydrocarbon adhered to the surfaces.

3. The method of claim 1, wherein the porous media is a subterranean hydrocarbon bearing formation containing asphaltene and wherein the asphaltene is adhered to the surfaces of the porous media.

4. The method of claim 3, wherein the hydrocarbon has an API gravity of between 6 and 16.

5. The method of claim 3, wherein the hydrocarbon has an API gravity of between 6 and 12.

6. The method of claim 1, wherein the surfactant is selected from the group consisting of cationic surfactants, nonionic surfactants, amphoteric surfactants and combinations thereof.

7. The method of claim 1, wherein the co-surfactant is an alcohol co-surfactant.

8. The method of claim 7, wherein the alcohol co-surfactant is selected from the group consisting of methanol, ethanol, propanol, butanol, pentanol, isopropanol, and combinations thereof.

9. The method of claim 1, wherein the carrier fluid is selected from the group consisting of organic solvents, light hydrocarbons, diluents, light crude oil, and combinations thereof, water, production water and brine.

10. The method of claim 1, wherein the carrier fluid is a light crude oil with an API gravity between 20 to 25.

11. The method of claim 1, wherein the surfactant is an ethoxylated nonyl phenol having between 4 and 60 ethoxylated groups, and wherein the co-surfactant is ethanol.

12. The method of claim 11, wherein the mixture contains equal amounts by volume of surfactant and co-surfactant.

13. The method of claim 11, wherein the mixture contains each of the surfactant and the co-surfactant at a concentration of between 0.5 and 5% wt.

14. The method of claim 11, wherein the mixture contains each of the surfactant and the co-surfactant at a concentration of between 1 and 4% wt.

15. The method of claim 1, wherein the surfaces of the porous media define pore space for the hydrocarbon, and wherein the surfaces are defined by a material selected from the group consisting of quartz, feldspar, siliceous mineral, carbonaceous mineral, clays, and combinations thereof.

* * * * *